July 12, 1949.　　　　　B. S. MILL　　　　　2,475,978
AIRCRAFT RELEASE MECHANISM

Filed Aug. 7, 1946　　　　　　　　　　　　　　2 Sheets-Sheet 1

Billy S. Mill
*INVENTOR.*

BY
HIS PATENT ATTORNEY

July 12, 1949.
B. S. MILL
2,475,978
AIRCRAFT RELEASE MECHANISM
Filed Aug. 7, 1946
2 Sheets-Sheet 2
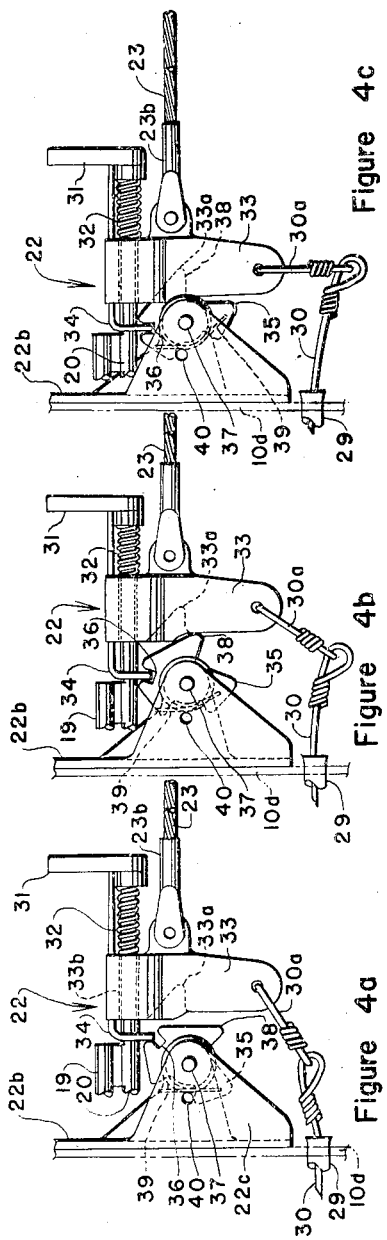
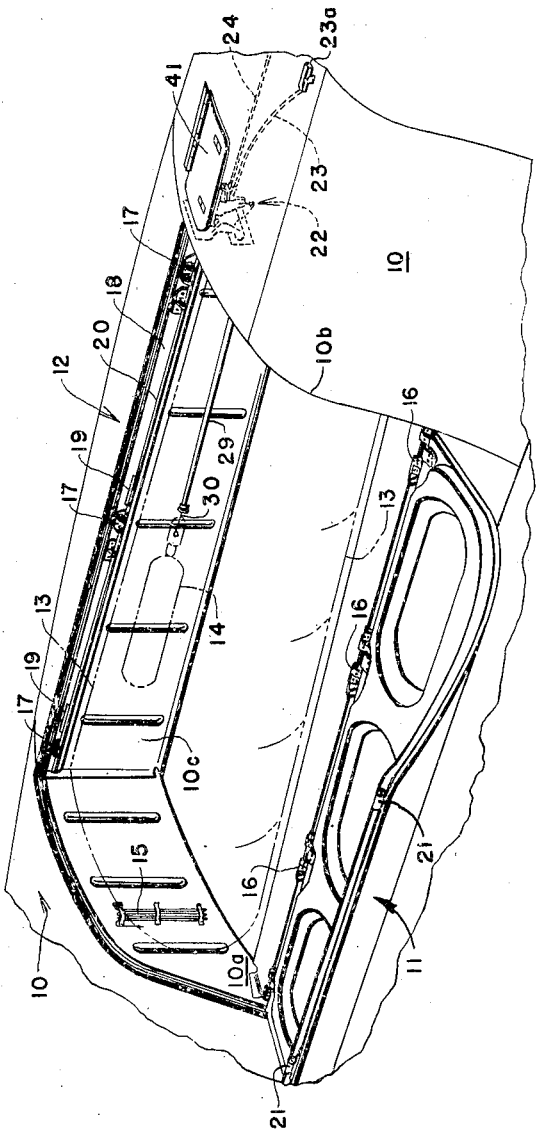
Billy S. Mill
INVENTOR
BY James M. Clark
HIS PATENT ATTORNEY Patented July 12, 1949

2,475,978

UNITED STATES PATENT OFFICE 2,475,978

AIRCRAFT RELEASE MECHANISM

Billy S. Mill, Seattle, Wash., assignor to Boeing Airplane Company, a corporation of Delaware Application August 7, 1946, Serial No. 688,954

12 Claims. (Cl. 244—1)

1

The present invention relates to improvements in release mechanisms and more particularly to releasing and latching arrangements for emergency equipment in aircraft and other vehicles.

It has been the general practice for some time to provide land type aircraft which are flown over water with emergency gear for the support of either the aircraft, or its occupants, or both. Small airplanes have frequently been provided with emergency flotation gear which is usually stowed within the fuselage or other portions of the airplane. Such emergency flotation gear may be actuated either manually by an occupant or automatically upon contact with the water to open its covering or doors and to cause the gear to become inflated to provide buoyancy for the desired portion of the airplane and to assist in its flotation upon the surface of the water for a predetermined period. In larger aircraft the practice has frequently been to provide one or more inflatable life rafts which are stowed within convenient compartments in the airplane for manual or automatic actuation in the event of an emergency landing or "ditching" operation upon the water to serve as life-saving floats for the occupants of the aircraft.

Such emergency flotation gear or life rafts are usually inflated with air or carbon dioxide stored within pressure cylinders or bottles. Inasmuch as the deflated gear in its stowed condition must be protected and covered when not in use, the release mechanism usually includes a suitable latch for the covers of the compartment and means for simultaneously or sequentially tripping or releasing both the latches for the compartment covers and the valves of the storage bottles for inflation of the emergency gear. Considerable difficulty has been met with in prior devices for latching and releasing the compartment closures and the bottle valves, and instances have occurred where such emergency gear has become ejected and inflated unintentionally during flight to the embarrassment and inconvenience of the pilot and occupants. Heretofore much difficulty has been met with in checking, testing and resetting the latching and release devices for such emergency gear. The present invention is directed to improvements in such latching, and resetting release devices, and the arrangement of their installation, and eliminates to a great extent most of the difficulties and deficiencies met with in prior devices intended for these and similar purposes. The present invention more particularly resides in an improvement upon the subject matter covered

2 by Patent No. 1,733,973 which issued October 29, 1929 to C. N. Monteith et al. for an Airplane emergency flotation gear.

It is accordingly a principal object of the present invention to provide an improved quick-acting latch and release mechanism for emergency inflatable equipment for aircraft and other vehicles. It is a further object to provide an improved mechanism for the closely sequential release of an emergency gear compartment door and the automatic inflation of the gear immediately upon release of the door latches. It is a further object to provide a quick-acting release device of the pin type adapted to prevent jamming of the door latches and in which the release action is assisted by the energy stored in one or more spring elements. A further object lies in providing such a release mechanism which is easily tested and readily resettable.

It is a still further object of the present invention to provide a simple fool-proof latching mechanism for the actuation of an inflatable emergency gear which mechanism embodies a lock to prevent unintended unlatching and is of a type which is unlikely to become opened in flight due to vibration and other causes. Further objects of this invention include the arrangement of inflatable emergency gear within compartments covered by doors which are released immediately prior to inflation of the gear and in which the release action may be manually or automatically initiated from one or more points remote from the installation of the gear. Other objects and advantages of the present invention will become apparent to those skilled in the art after reading the present specification taken together with the accompanying drawings forming a part hereof, in which:

Fig. 2 is a perspective view of the dual compartment installed in the upper portion of an airplane fuselage with the nearer one of the compartment doors opened;

Figs. 4a, 4b and 4c show progressive stages in the resetting of the latching mechanism.

Figure 1:
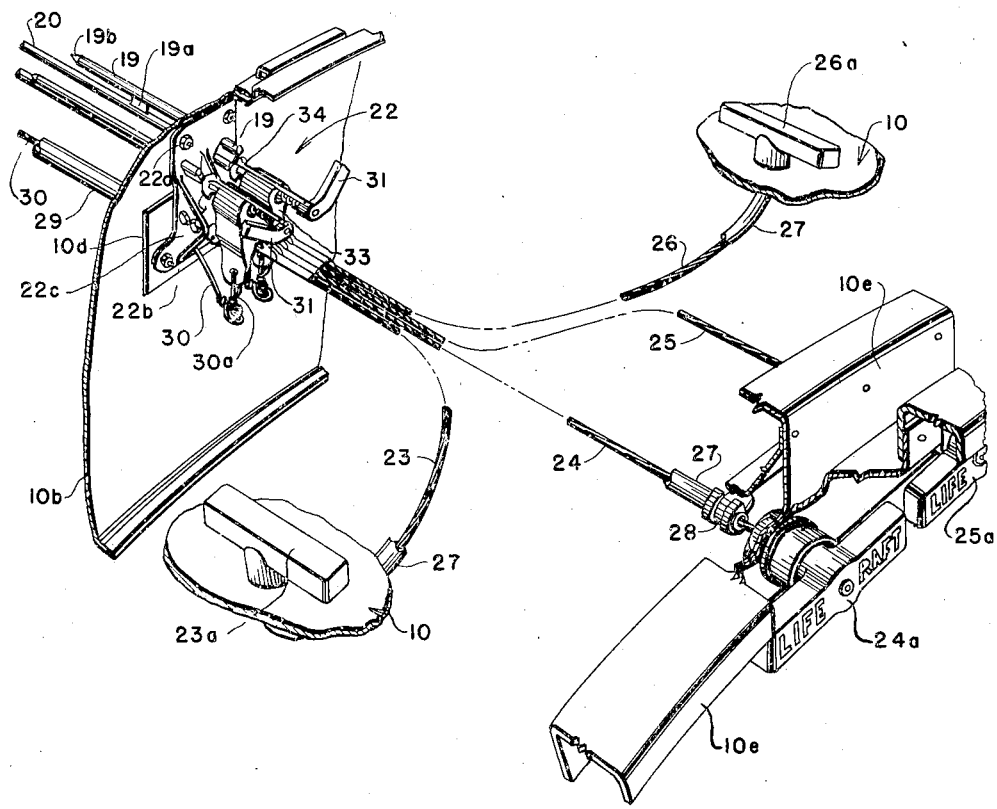
Fig. 1 is a perspective view of the latching and release mechanism for a dual installation of inflatable life rafts.

Referring now to Figs. 1 and 2, the numeral 10 indicates the fuselage of an airplane in the upper portion of which are provided a pair of laterally disposed life raft compartments provided with the closures or doors 11 and 12. The nearer door 11 is shown in its fully opened position revealing within the raft compartment the folded and stowed life raft 13 indicated in broken lines and which has connected to it the inflating bottle 14. The compartments are defined by the transverse fuselage bulkheads 10a and 10b and the intermediate longitudinal bulkheads 10c. A suitable lanyard or painter 15 may be supported in a coiled position upon the bulkhead 10a, being attached to the raft 13 in such a manner that the latter will not be caused to float too far from the aircraft while it is upon the water. The lanyard 15 also provides suitable means by which the occupants may pull the raft closer to the floating or partly submerged airplane for more convenient access to it.

Figure 3:
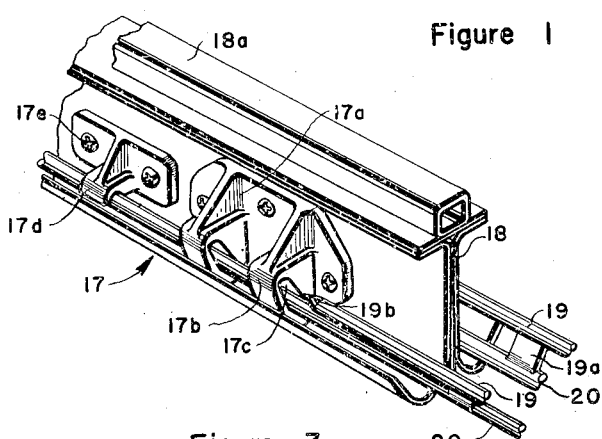
Fig. 3 is a similar perspective view of a pin type latching mechanism as provided along the release hinge of the compartment doors.

The door 11 is preferably hinged at its lower outer edge by means of the hinge units 16. The latch mechanism preferably consists of a plurality of units 17 mounted upon the longitudinal beam structure 18 immediately above the central bulkhead 10c. Each of these latch units, as shown in the perspective view in Fig. 3, consists of a bracket 17a having spaced projecting lugs 17b each of which is slotted at 17c to receive at its upper end a latch pin 19. The latter pin is carried at a predetermined spacing above an elongated guide rod 20 from which it is intermediately spaced by the spacers 19a, the guide rod 20 extending through the lower end of each of the lug slots in each of the several units 17. Immediately adjacent and forming a part of each of the latch units 17 is a downwardly facing bracket 17d which serves as a guide for the guide rod 20 and maintains the latter in its proper position at the bottom of the grooves or slots 17c. The brackets 17a and 17b are suitably attached to the web of the beam structure 18 by the bolts 17e and the upper flange of the beam has attached thereto a hollow spacing element 18a which serves to maintain a flush and continuous outer surface between the contiguous edges of the closures 11 and 12.

Each closure carries at its releasable edge the lugs 21 which are located in the spaced positions corresponding to the gaps between the slotted brackets 17b, each being of a length suitable for reception between the slotted lugs of the corresponding unit 17. These lugs 21 are suitably apertured to receive the latching pins 19 which have pointed ends 19b, and it will accordingly be noted that when the guide bar 20 is pulled toward the right in Figs. 2 and 3 into the position shown in Fig. 3, the pins 19 are withdrawn from the apertures in the lugs 21 as well as from the slots in the brackets 17b to permit the doors to be rotated outwardly about the hinges 16 into the open position shown in Fig. 2. Referring to Fig. 1, there is shown mounted upon the rear transverse bulkhead 10b and the reenforcing plate 10d, a release assembly 22 attached to the bulkhead and reenforcing plate by means of the mounting bolts 22a. This release assembly 22 also embodies a lock which prevents unintentional unlatching of the life raft doors 11 and 12, or undesired release of the carbon dioxide bottle 14. The release and lock assembly is of the dual type serving to latch or unlatch the adjacent edges of both doors as well as to release the inflating bottles of each of the adjacent life rafts. The doors and bottles are normally actuated individually as a unit on either side of the fuselage but both units can be operated simultaneously if desired by pulling on both handles at the same time. A plurality of door release cables 23, 24, 25 and 26 extend to these remote release handles 23a, 24a, 25a and 26a respectively. The cables preferably extend through flexible tubing 27 which may be of tinned wire type suitably guided and supported as at 28 from the fuselage structure 10e. The transverse bulkhead 10b is suitably apertured to permit the pins 19 and guide rods 20 to extend therethrough as well as the pair of flexible tubes 29 within which the cables 30 extend forwardly to the inflating bottles 14.

In Figs. 4a, 4b and 4c, a locking and release assembly 22 is shown in the released, partially reset and latched positions respectively. Resetting handles 31 are fixedly attached to the ends of each of the latch pin guide rods 20 and a latch coil spring 32 co-axially encircles each of these ends of the guide rods. Inasmuch as the latch pins 19 frequently tend to stick or bind in the lugs 17b and 21, the incorporation of the compression spring 32 in the releasing mechanism assists by imparting a sharp pull upon the guide rod 20 to provide a quick-action device which snaps the pins into their released or unlatched positions. A release slide member 33 has an upper apertured bore portion 33b which also encircles the rear portion of the guide rod 20 and cooperates with the handle 31 to compress the spring 32 when the release slide member 33 is pulled rearwardly by the above mentioned release cable 23 to which it is attached by the clevis or other terminal connection 23b. The release slide member 33 has a downwardly extending portion to which is attached the rearward terminal of the pressure bottle release cable 30 through the medium of the attachment loop 30a. As stated above, when the cable 23 is pulled to the right in Figs. 4a, 4b and 4c, the spring 32 will be further compressed as the release slide member 33 pulls toward the right, provided of course that the resetting handle 31 does not move. For this reason a lock device is provided to restrain movement of the handle 31 until such time as the spring 32 has been compressed sufficiently to pull the latching pin 20 with a snap action when the handle 31 is permitted to move.

The release assembly 22 is supported from the transverse bulkhead 10b and the intermediate spacing plate 10d by the aforementioned mounting bolts 22a passing through its back plate portion 22b from the sides of which a plurality of brackets 22c are integrally formed. Between each pair of these brackets there is pivotally mounted a locking wheel 35 having a notch 36 in its periphery, the wheel being rotatably mounted upon a pivot or axle 37 journalled within the brackets 22c. Attached to the resetting handle 31 is a forwardly extending hooked bar 34 (which may be slidably guided by the release slide member 33) and has its downwardly extending hooked portion adapted to engage the notch 36 in the locking wheel 35. The forward face of the release slide 33 is provided with a triangular notch 33a adapted to be engaged by the similarly triangular shaped toe 38 of the locking wheel 35. The snap action of the release mechanism may be augmented by the inclusion of an auxiliary spring 39 attached to one of the lobes of the locking wheel 35, the auxiliary spring bearing against the stop pin 40 which is preferably disposed between the adjacent spaced shoulders or lobes on the cam or locking wheel 35 to prevent over travel of the locking wheel in either direction.

Referring now to Fig. 4c, which shows the release assembly in its reset and latched condition, let us assume that only the left or port life raft is to be released and inflated. It will be understood that the action can be initiated either interiorly of the fuselage by pulling on the handle 24a, or exteriorly of the fuselage by opening the access door 41 and pulling on the handle 23a. Both release cables 23 and 24 are attached to the same release slide member 33 and pull on either cable to the rear, or to the right in Fig. 4c, will tend to move the release slide 33 into the unlocked position shown in Fig. 4b. In the latter figure, it will be noted that the release slide 33 has moved toward the right a sufficient distance that the toe 38 of the locking wheel 35 has been moved out of the notch 33a in the release slide due partly to the tendency of the hooked bar 34 to move to the right, and the tendency of the spring 39 to impart clockwise movement to the locking wheel 35. As the release slide is pulled toward the right, therefor, the handle 31 is held against movement in the same direction by the hooked bar 34 the end of which is received in the notch 36 in the periphery of the locking wheel 35. As long as this wheel 35 is prevented from rotating from the position shown in Fig. 4b about its axle 37, the handle 31 cannot move to the right as shown in this figure for releasing the latch pin 20.

Rotation of the locking wheel 35 is prevented by engagement of its toe portion 38 in the notch 33a formed in the release slide 33. The length of the toe 38 governs the degree of movement of the slide 33 toward the handle 31 which must be effected before the handle 31 can move to pull the pin 20. As soon as the slide 33 has been moved far enough to clear the toe 38 of the wheel 35, it is rotated clockwise into the position shown in Fig. 4a to release the end of the hooked bar 34, this clockwise rotation being assisted by the energy stored in the auxiliary spring 39. By the impetus which this latter spring gives the wheel 35, it assists the coil spring 32 in forcing the handle 31 to the right, and the guide rod 20 in the same direction, when the notch of the release slide 33 clears the toe 38. The carbon dioxide bottle release cable 30 is attached to the downwardly projecting portion of the release guide 33 in order that a continued pull to the right on the guide by the cable 23 will subsequently release the carbon dioxide bottle to eject and inflate the life raft. The releasing movement of the guide rod 20 to the right is arrested, after the pins 19 are withdrawn from the latching lugs 21, and the valve of the bottle 14 is fully opened by a suitable stop on the valve actuator, or a limit stop may preferably be provided on the guide rod and pin assembly 19—20 to abut against the face of the bulkhead wall 10b.

The sequence of movement of the parts of the release assembly 22 to reset the lock is illustrated in the three portions of Fig. 4. Pressure on the resetting handle 31 tending to move it toward the left in these figures, is transmitted through the spring 32 which urges release slide 33 to the left with the handle 31 until it engages the back of the toe 38 on the cam wheel 35. The end of the hooked bar 34 fitting into the notch 36 of the cam wheel will cause the latter to rotate in a counterclockwise direction against the action of the auxiliary spring 39. Since further movement of the release slide 33 to the left will be prevented by its engagement with the cam wheel, continued pressure on the handle 31 will compress the spring 32 as the cam wheel 35 is rotated in a counterclockwise direction. As a matter of fact, the slide 33 will actually be forced to the right somewhat as the toe 38 of the cam wheel 35 moves upward against it. When the wheel 35 has been rotated sufficiently to bring the toe 38 into registry with the notch 33a in the slide 33 the pressure of the spring 32 will force the slide 33 to the left over the toe 38 on the cam wheel to bring the parts into their locked position. In an actual installation a cable pull through approximately 1½ inches gave very satisfactory results. The stop pin 40 with which the spaced shoulders on the wheel 35 may abut, prevents over-travel of the wheel in either direction and limits the counterclockwise rotation of the wheel to establish the reset or cocked position of the elements of the assembly as shown in Fig. 4c and from which position the closure doors and inflating bottles can again be actuated by tripping the release assembly.

The described mechanism provides an efficient and easily operated releasing gear which is both positive and quick acting to sequentially unlatch the compartment door and to automatically inflate the life raft contained within the compartment. It will be noted that this mechanism contains a fool-proof feature to prevent unintended unlatching due to vibration and other causes and its unlatching operation is accompanied by a snap action release which prevents jamming of the latching pins. The present release gear and latching mechanism has been found particularly satisfactory in life raft release installations which require frequent checking and testing, and has proven very desirable in these installations due to the facility with which the gear can be quickly and positively reset. It will be understood that the life raft is stowed within the compartment in a deflated condition preferably rolled into a carrot- or cone-shape with its large end toward the front. The deflated and partially rolled raft is pushed laterally into the compartment with its unrolled portion toward the middle in order that the raft will automatically eject itself when the valve of the carbon dioxide bottle is opened. It will also be understood that as the raft is inflated and is automatically thrown overboard to the side of the fuselage the lanyard or painter 15, which is attached at one end to the raft, will be uncoiled to tether the raft to the aircraft in order that it will not float out of reach of the occupants.

Other forms and modifications of the present invention both with respect to its general arrangement and the details of its respective parts are intended to fall within the scope and spirit of this invention as more particularly set forth in the appended claims.

I claim:

1. In a vehicle body provided with a compartment for a releasable member, a closure for said compartment releasably attached to said body, a latching assembly supported upon said body operatively connected to said releasable closure attachment, releasing means operatively engaging said latching assembly and resilient means associated with said latching assembly arranged to resiliently bear against said releasing means to maintain the same in a locked condition of the latching assembly and to impart snap action to said releasable closure attachment upon the latching assembly being tripped by said resiliently opposed releasing means.

2. In aircraft, a compartment, a closure for said compartment releasably attached to the aircraft, an inflatable member normally stowed within said compartment, a release assembly for said inflatable member and said compartment closure including a latching mechanism supported upon the aircraft operatively connected to the closure attachment, and resilient means operatively associated with said latching mechanism arranged to maintain said mechanism in its locked condition and to be further compressed as said assembly is released to impart a quick-acting force for the unlatching of said closure assembly prior to the actuation of said inflatable member.

3. In a vehicle body provided with a compartment, an inflatable flotation element in said compartment, a closure for said compartment releasably attached to said body, inflating means operatively connected to said flotation element, a latching assembly supported upon said body operatively connected to said releasable closure attachment and to said inflating means, releasing means operatively engaging said latching assembly resilient means associated with said latching assembly arranged to resiliently bias said releasing means to maintain the same in a locked condition and to impart snap action to both said releasable closure attachment and said inflating means upon being tripped by said releasing means.

4. In a vehicle body provided with a compartment for a releasable member, a closure for said compartment releasably attached to said body, a latching assembly supported upon said body operatively connected to said releasable closure attachment, resilient means associated with said latching assembly adapted to maintain the same in a locked condition, and actuating means associated with said latching assembly adapted to impart energy to said resilient means upon actuation of said latching assembly which energy imparts snap action to said releasable closure attachment.

5. In a vehicle body provided with a compartment, an inflatable flotation element in said compartment, a closure for said compartment releasably attached to said body, inflating means operatively connected to said flotation element, a latching assembly supported upon said body operatively connected to said releasable closure attachment and to said inflating means, said assembly including a rotatable element and a slidable guide element engageable by said rotatable element, resilient means associated with said latching assembly adapted to maintain said rotatable and guide elements in a locked condition, actuating means connected to said guide element for applying tripping movement thereto against the opposition of said resilient means in such manner as to aid in imparting snap action to said closure release upon tripping of said latching assembly.

6. In a vehicle body provided with a compartment, an inflatable flotation element in said compartment, a closure for said compartment releasably attached to said body, inflating means operatively connected to said flotation element, a latching assembly supported upon said body operatively connected to said releasable closure attachment and to said inflating means, said assembly including a rotatable element and a slidable guide element engageable by said rotatable element, resilient means associated with said latching assembly adapted to maintain said rotatable and guide elements in a locked condition, said resilient means aiding in imparting snap action to said releasable closure attachment upon being tripped and means attached to said releasable closure attachment and to said latching assembly through the intermediacy of said resilient means for resetting said latching assembly subsequent to its being tripped.

7. In a device for the release of a closure from a supporting body, pin means extendable through aligned apertures in said closure and said body, a tongued element rotatably mounted upon said body, an abutment carried by said pin means, an actuating element slidably mounted upon said pin means and having a recess engageable by the said tongued element, resilient means interposed between said actuating element and said pin abutment to maintain said device in the extended latched condition of said pin means, locking means carried by said pin means engageable with said rotatable element in such manner that movement of said actuating element away from said rotatable element permits release of said tongue and said pin locking means, and said resilient means imparts snap action retraction to said pin means against its said abutment for the rapid unlatching of said pin means from said aligned apertures.

8. In a device for the release of a closure from a supporting body, pin means extendable through aligned apertures in said closure and said body, a tongued element rotatably mounted upon said body, an actuating element slidably mounted for longitudinal movement with respect to said pin means, said actuating element having a recess engageable by the said tongued element, coil spring means disposed about said pin means between a fixed portion thereof and said actuating element to maintain said device in the extended condition of said pin means and the latched condition of said closure, locking means carried by said pin means engageable with said rotatable element in such manner that movement of said actuating element away from said rotatable element permits rapid release of said tongue and said pin locking means assisted by said coil spring means, and movement of said pin means in the opposite direction causes said locking means to engage said rotatable element and the tongue of said rotatable element to engage said actuating element for the resetting of said release device.

9. The arrangement in a vehicular body compartment as set forth in claim 1 characterized by the inclusion of resetting means operatively associated with said latching assembly and resiliently opposing through said resilient means the releasing movement of said releasing means.

10. The arrangement in a vehicular compartment as set forth in claim 4 characterized by the inclusion of manual resetting means operatively associated with said latching assembly and resiliently opposing releasing movement of said releasing means through the medium of said resilient means.

11. A release mechanism for latching a relatively movable member to a relatively fixed member comprising a latch element engageable with said fixed and movable members, pivotally mounted detent means, a hook element carried by said latch element engageable with said detent means in the latched position of said mechanism, a slidably mounted release element having a portion engageable with said detent means in the latched position of said mechanism and in the engaged condition of said hook portion, and resilient means urging said release element into its engaged position in which it prevents rotation of said detent means and retention of the said hook element and said latch element.

12. A readily resettable release mechanism for latching a relatively movable member to a relatively fixed member comprising a latch element engageable with said fixed and movable members, pivotally mounted detent means, a hook element carried by said latch element engageable with said detent means in the latched position of said mechanism, a slidably mounted release element having a portion engageable with said detent means in the latched position of said mechanism and in the engaged condition of said hook element and resilient means urging said release element into its engaged position in which it prevents rotation of said detent means and the retention of the said hook element and said latch element, releasing movement of said release element initially serving to compress said resilient means prior to release of said hook element whereafter the energy of said compressed resilient means is imparted to said latch elements for the quick opening of said latch mechanism, and resetting means associated with said latch element whereby movement in a direction opposite to said releasing movement causes said hook and release elements to engage said detent means and is aided by said compressed resilient means for maintaining said release element in the latched condition of said mechanism.

BILLY S. MILL.

REFERENCES CITED

The following references are of record in the file of this patent:

UNITED STATES PATENTS

| Number | Name | Date |
|---|---|---|
| 1,774,625 | Alexander | Sept. 2, 1930 |
| 2,264,321 | Manson | Dec. 2, 1941 |
| 2,353,440 | Bresee | July 11, 1944 |